(No Model.)

W. AMOS.
INSECT TRAP.

No. 485,077.  Patented Oct. 25, 1892.

Witnesses.
Charles Hannigan
James W. Beaman

Inventor.
William Amos
by S. Scholfield, Atty.

UNITED STATES PATENT OFFICE.

WILLIAM AMOS, OF PROVIDENCE, RHODE ISLAND.

INSECT-TRAP.

SPECIFICATION forming part of Letters Patent No. 485,077, dated October 25, 1892.

Application filed July 9, 1892. Serial No. 439,498. (No model.)

*To all whom it may concern:*

Be it known that I, WILLIAM AMOS, a citizen of the United States, residing at Providence, in the State of Rhode Island, have invented a new and useful Improvement in Insect-Traps, of which the following is a specification.

My invention consists in the improved construction and arrangement of the parts of the trap, as hereinafter fully set forth.

Figure 1:
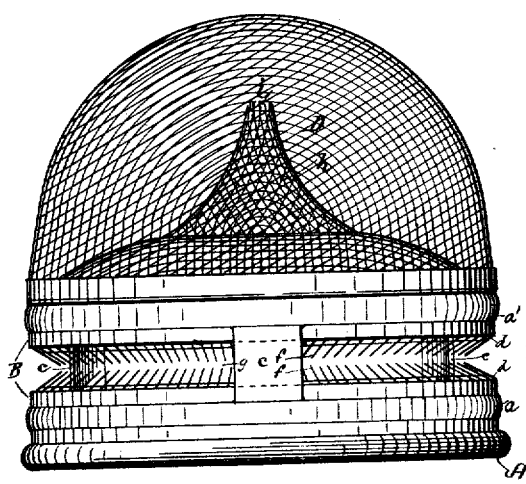
Figure 2:
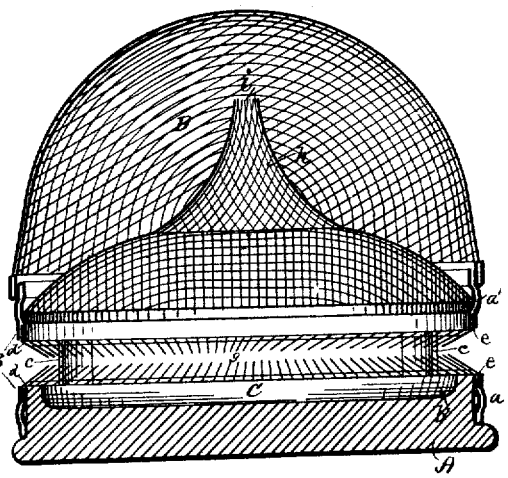
Figure 3:
Figure 6:
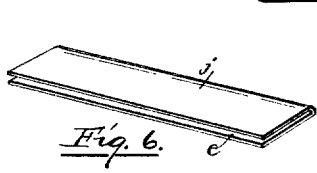
Figure 4:
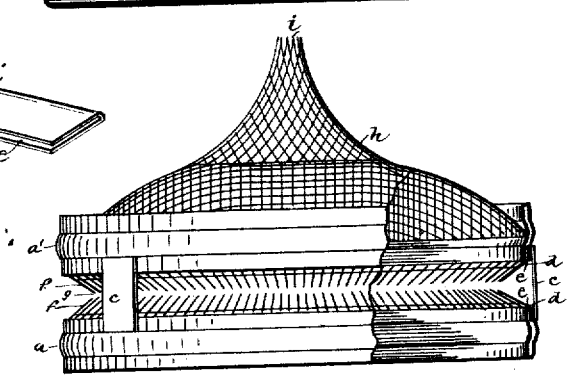
Figure 5:
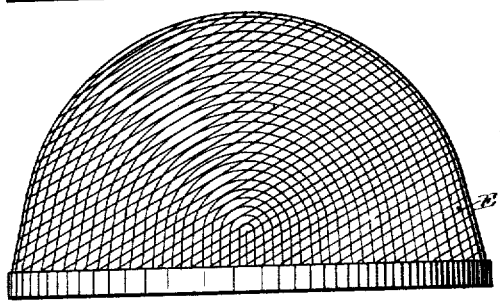

Figure 1 represents a side elevation of the trap. Fig. 2 represents a vertical section of the same. Fig. 3 represents an edge view of the base-plate with a portion broken away. Fig. 4 represents a side view of the body portion of the trap with a portion broken away. Fig. 5 represents a side view of the removable cover. Fig. 6 represents a perspective view of the folded sheet-metal strip of which the rings are made for the body of the trap.

In the accompanying drawings, A represents the base-plate, which may be made of wood and provided with a recess $b$, adapted to hold a suitable bait for the trap, and upon the base A is removably placed the body portion B, which consists of the metal rings $a\ a'$, connected to each other by means of the standards $c\ c\ c$. The rings $a\ a'$ are preferably made by folding a strip $j$ of sheet metal, as shown in Fig. 6, and then soldering the ends of the strip together. A piece of raveled wire-gauze $d$ is inserted into the open edge $e$ of the strip or ring, suitably fastened therein, and bent so that the ends of the wires $f$ of the raveled wire-gauze, attached to each of the rings $a\ a'$, will project inwardly at an angle with each other, as shown in Fig. 4, leaving a vertical space $g$ between the ends of the wires suitable for the passage of insects into the bait-chamber C of the trap. To the upper ring $a'$ is attached the wire-gauze funnel $h$, through the contracted orifice $i$ of which the insects will pass from the bait-chamber C into the trap-chamber D, formed by the wire-gauze cover E, which removably fits the ring $a'$. The trap is thus made accessible in every part, is of simple construction, and very efficient in operation.

I claim as my invention—

1. The combination, with the base-plate and the rings connected by suitable standards, of the raveled wire-gauze secured to the rings, with the uncovered wires of the gauze arranged to project inwardly from the rings to form an inlet-opening at the ends of the wires, substantially as described.

2. The combination, with the base-plate, of the rings connected by suitable standards and provided with the wires projecting inwardly from the rings to form an annular inlet-opening, substantially as described.

3. The combination, with the base-plate and the rings connected by suitable standards and provided with the wires projecting inwardly from the rings to form an annular inlet-opening, of the wire-gauze funnel and the cover forming the trap-chamber, substantially as described.

WILLIAM AMOS.

Witnesses:
SOCRATES SCHOLFIELD,
JAMES W. BRUMUN.